United States Patent
Fetzer et al.

(10) Patent No.: US 6,895,497 B2
(45) Date of Patent: May 17, 2005

(54) MULTIDISPATCH CPU INTEGRATED CIRCUIT HAVING VIRTUALIZED AND MODULAR RESOURCES AND ADJUSTABLE DISPATCH PRIORITY

(75) Inventors: Eric S. Fetzer, Longmont, CO (US); Wayne Kever, Fort Collins, CO (US); Eric DeLano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 10/092,714

(22) Filed: Mar. 6, 2002

(65) Prior Publication Data

US 2003/0172250 A1 Sep. 11, 2003

(51) Int. Cl.[7] .................................................. G06F 9/38
(52) U.S. Cl. .......................................... 712/215; 712/23
(58) Field of Search ................................ 712/212, 215, 712/23

(56) References Cited

U.S. PATENT DOCUMENTS

| | | | | |
|---|---|---|---|---|
| 5,627,982 A | * | 5/1997 | Hirata et al. ................. 712/206 |
| 5,724,565 A | * | 3/1998 | Dubey et al. ................. 712/245 |
| 5,761,469 A | * | 6/1998 | Greenley ...................... 712/210 |
| 5,944,811 A | * | 8/1999 | Motomura ..................... 712/23 |
| 6,105,127 A | * | 8/2000 | Kimura et al. ............... 712/215 |
| 6,349,381 B1 | * | 2/2002 | Tremblay ..................... 712/215 |
| 6,742,111 B2 | * | 5/2004 | Soni ............................ 712/217 |

FOREIGN PATENT DOCUMENTS

| | | |
|---|---|---|
| EP | 0644482 A1 | 9/1994 |
| WO | WO 01/04750 | 1/2001 |

* cited by examiner

*Primary Examiner*—Eric Coleman

(57) ABSTRACT

A multiple dispatch processor has several instruction fetch units, each for providing a stream of instructions to an instruction decode and dispatch unit. The processor also has an resource allocation unit, and multiple resources such as combined integer and address execution pipelines and floating point execution pipelines. Each instruction decode and dispatch unit requests resources needed to perform an instruction of the resource allocation unit, which arbitrates among the multiple instruction decode and dispatch units.

5 Claims, 4 Drawing Sheets

MULTIDISPATCH CPU INTEGRATED CIRCUIT HAVING VIRTUALIZED AND MODULAR RESOURCES AND ADJUSTABLE DISPATCH PRIORITY

FIELD OF THE INVENTION

The invention pertains to the field of multi-dispatch, superscalar, computer architecture. In particular, the invention relates to circuitry and methods for simultaneously dispatching multiple operations from multiple instruction decode and dispatch units into multiple pipelines, where the multiple pipelines are shared by the multiple instruction decode and dispatch units.

BACKGROUND OF THE INVENTION

Most modern processors embody several pipelined functional units. Typical such units include integer units capable of performing integer arithmetic between register operands, and floating point units capable of performing floating point arithmetic between register operands. There may be dedicated functional units for performing address arithmetic, or, in some machines, integer units may perform these operations. Other functional units may include fetch and store units that operate to retrieve operands from, or store results into, memory. These functional units are referred to as resources.

Many modern processors are capable of commanding operations in more than one functional unit simultaneously. The process of commanding operations in functional units is instruction decode and dispatch.

Superscalar machines have sufficient resources, and sufficiently complex control, that it is possible to dispatch operations from more than one instruction simultaneously. It is known, however, that such machines can only keep all their functional units busy for only a small percentage of time. Most of the time only a subset of functional units are actually performing useful work, in effect the load factor on these functional units is typically low.

Much modern software is written to take advantage of multiple processor machines. This software typically is written to use multiple threads. Software is also frequently able to prioritize those threads, determining which thread should receive the most resources at a particular time.

Multithreaded processors are those that have more than one instruction counter, typically have more than one register set, and are capable of executing more than one instruction stream. For example, machines are known wherein a single pipelined execution unit is timeshared among several instruction streams. Since the execution unit is timeshared, each instruction stream tends to execute somewhat slowly. These machines appear to software as multiple, independent, typically slow, processors.

Machines of superscalar performance having multiple processors on single integrated circuits are known. Machines of this type include the IBM Power-4 and the PA 8800. Typically, each processor on these integrated circuits has its own set of execution unit pipelines. Their die area, and therefore cost, for execution units is therefore typically much greater than with a timeshared multithreaded machine.

It is also known that the power consumed by large logic circuits, such as processors, is a function of the number of gates switching in each clock cycle, the capacitance on each gate, and the power supply voltage. There are many advantages to reducing the power consumed by a processor, ranging from increased battery life in portable or mobile applications to lessening air conditioning load of computer rooms containing multiple large machines.

While single-integrated-circuit multiprocessor machines offer good performance, they make inefficient use of their resources and consume considerable power.

SUMMARY OF THE INVENTION

A multiple dispatch machine has multiple, pipelined, dynamically allocated, functional units. These functional units include generalized functional units, for example each integer unit is capable of performing integer numeric operations as well as address computations. An embodiment incorporates floating point and load/store units in addition to generalized integer and address numeric units.

The multidispatch machine also has two, three, or more instruction decode and dispatch units, and a functional unit allocation unit. The functional unit allocation unit is capable of dynamically allocating the functional units to instruction streams executing on the multiple instruction decode and dispatch units. The allocation is performed in such way that the functional units have a higher utilization factor than in a typical machine as known in the art. The machine therefore makes more efficient use of its resources than a typical multiple-processor integrated circuit while consuming less power.

In a particular embodiment, the functional unit allocation unit is priority-based, with individual priority settings for each instruction decode and dispatch unit. A particular instruction decode and dispatch unit may be given high priority, such that it receives all the resources it requests; a medium priority, where it receives resources on a basis equal to other medium priority units when they are not used by high priority units; a low priority; and a low priority with a guaranteed minimum throughput.

DETAILED DESCRIPTION OF THE EMBODIMENTS

Figure 1:
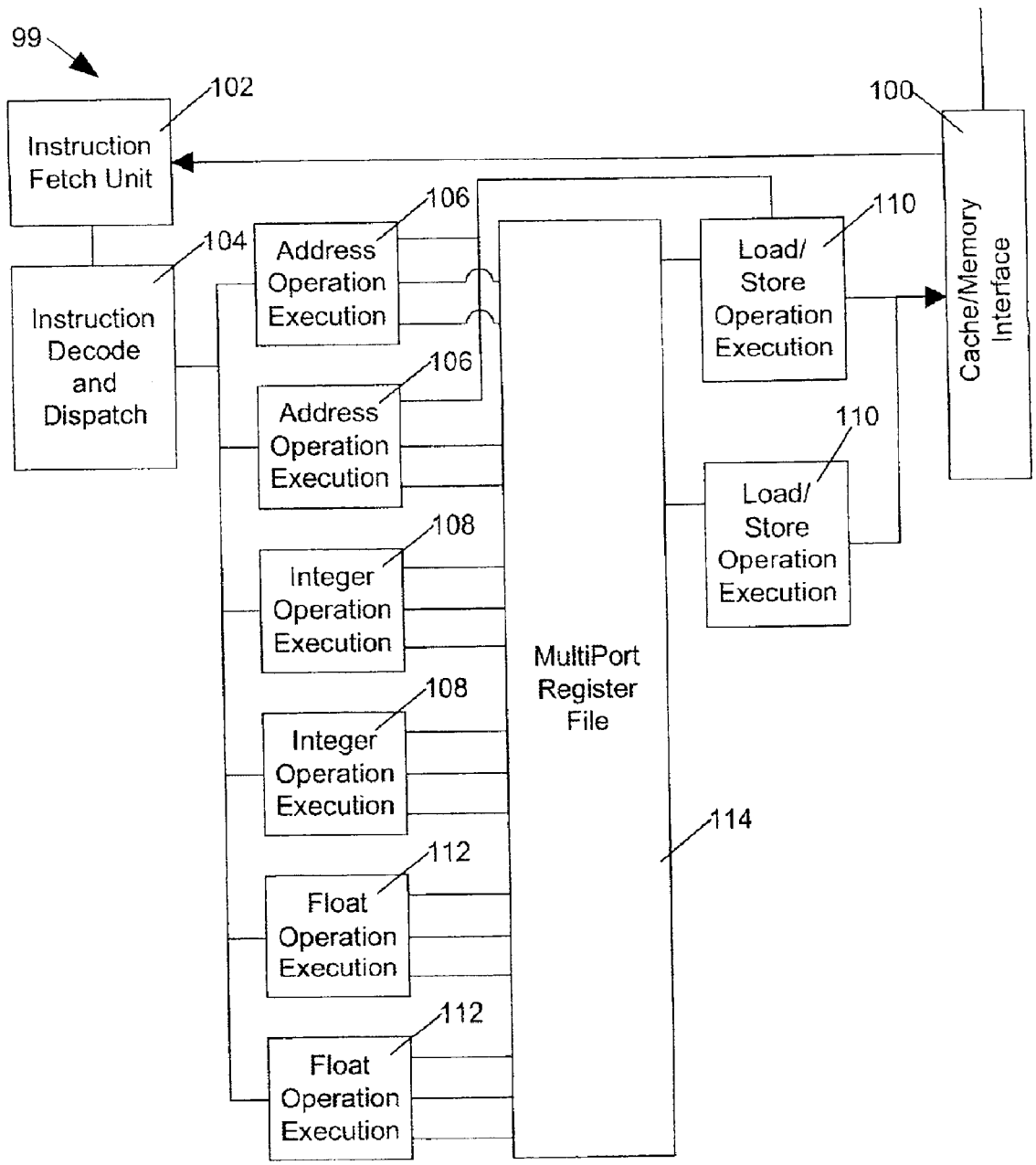
FIG. 1 is a block diagram of portions of a superscalar processor as known in the art, having six execution pipelines, of which two are dedicated to performing address operations, two are capable of performing general integer operations, and two are dedicated to floating point operations.

FIG. 1 is a block diagram of portions of a core of a superscalar processor 99 as known in the art. This processor receives instructions from cache (not shown) through a cache/memory interface 100 into an instruction fetch unit 102. These instructions are decoded in an instruction decode and dispatch unit 104, which then dispatches them to functional units (106, 108, 110, and 112) for execution. Address operations are dispatched to address operation execution units 106, integer operations to integer operation execution units 108, load/store operations to load/store operation execution units 110, and floating point operations to floating point execution units 112. Address operation execution units 106, integer operation execution units 108, load/store operation execution units 110, and floating point execution units 112 fetch their operands and store their results in a multiport register file 114. Multiport register file 114 has a large number of port, for example in one prior art machine it may have twelve read ports, and eight write ports.

Corresponding portions 199 of the present processor receive instructions from cache through cache/memory interface 200 for a first thread into a first instruction fetch unit 202. Additional instructions are fetched for a second thread through cache/memory interface 200 into a second instruction fetch unit 204. Instructions from the first instruction fetch unit 202 are decoded in a first instruction decode and dispatch unit 206, and instructions from the second instruction fetch unit 204 are decoded in a second instruction decode and dispatch unit 208. Each instruction decode and dispatch unit may receive multiple instructions in a processor clock cycle; although the actual number of instructions dispatched each cycle will vary with load and dependencies.

Both instruction decode and dispatch units 206 and 208 communicate with a resource allocation unit 210. Each decode and dispatch unit 206 and 208 determines the resources it needs to perform the instructions it is preparing to dispatch, and requests those resources of the resource allocation unit 210. Resource allocation unit 210 then allocates and grants resources to each decode and dispatch unit 206 and 208. Decode and dispatch units 206 and 208 then distribute decoded operations to the appropriate functional execution units 220, 222, and 224.

Functional execution units 220, 222, and 224 include multifunction integer units 220, capable of performing either integer arithmetic operations or address computations; floating point units 222 capable of performing floating point arithmetic operations; and load/store units 224.

The functional units 220, 222, and 224 retrieve their operands, and store results, in a multiport register file 230.

In normal operation, it is anticipated that the functional units requested by each instruction decode and dispatch unit 206, 208, will vary from cycle to cycle. Sufficient functional execution units are provided that each decode and dispatch unit receives all resources it requests in most, but not all, processor cycles.

For typical instruction mixes, each instruction decode and dispatch unit can dispatch to its maximum possible number of functional units in only a minority of processor cycles. In those cycles it is statistically likely that other decode and dispatch units of the machine will need fewer functional units than their maximum. Therefore, an optimum number of functional units is provided where each instruction decode and dispatch unit rarely stalls due to unavailability of resources. This optimum is less than the number of functional units required for multiple independent processors of similar, superscalar, performance.

The resource allocation unit 210 is capable of operating in a random mode and in a priority mode. In random mode, when fewer resources are available than requested, resource allocation unit 210 grants the available resources evenly among requesting instruction decode and dispatch units 206, 208. In priority mode, resource allocation unit 210 grants resources such that high priority instruction decode and dispatch units 206 have first call on resources, with remaining resources distributed among instruction decode and dispatch units 208 of lower priority. Multiple levels of priority are provided, and each instruction decode and dispatch unit 206, 208, is associated with a priority level.

When an instruction decode and dispatch unit 206, 208 requests one or more functional units that are not granted to it, it dispatches as many operations as possible to granted units, and stalls the remaining operations until the next cycle.

Figure 2:
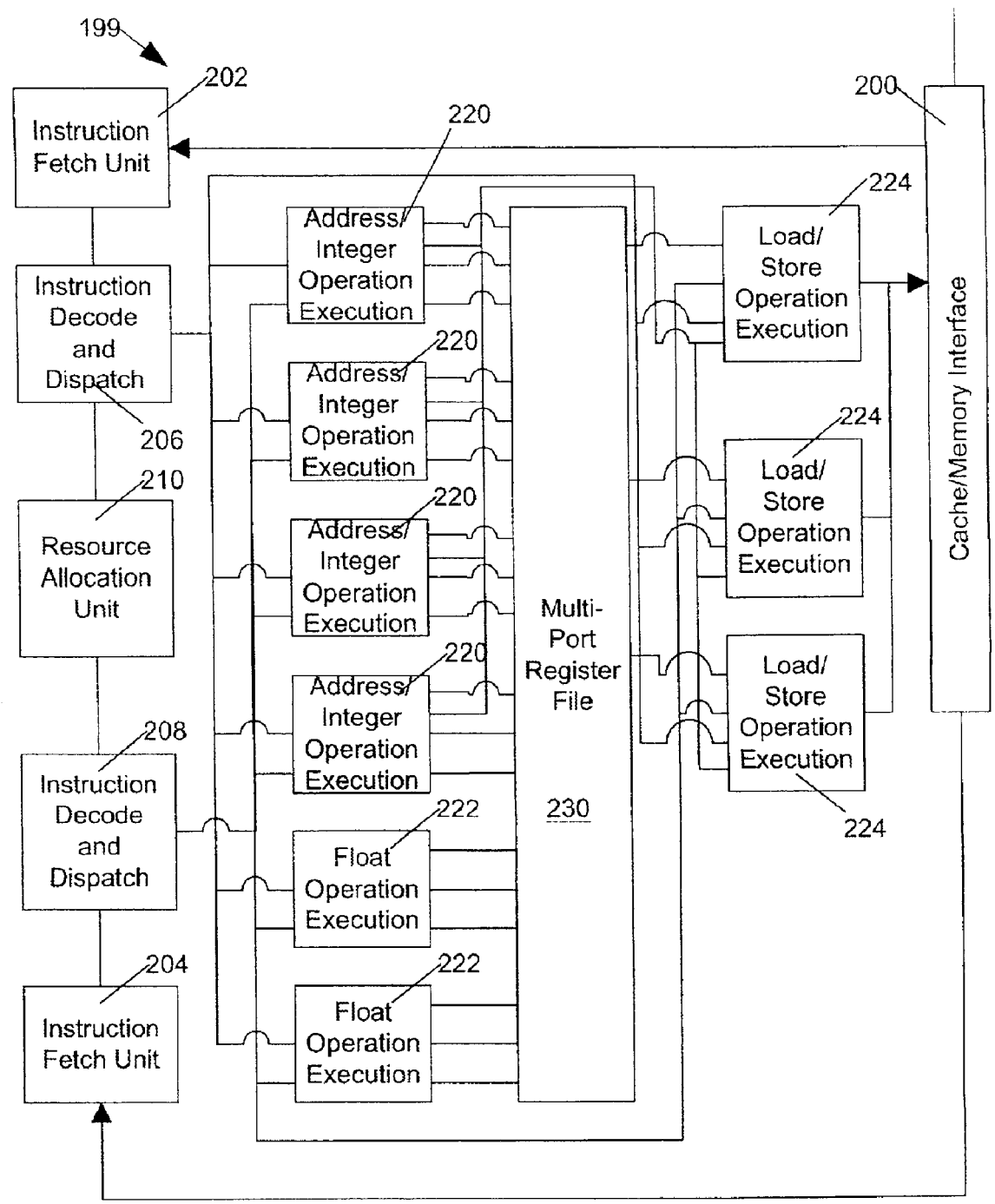
FIG. 2, a block diagram of portions of a superscalar processor embodying the present invention.

The design of FIG. 2 is extensible to greater numbers of instruction decode and dispatch units 206 and 208, as well as to greater numbers of functional units including combined address and integer operation execution units 220. In particular, an implementation having four decode and dispatch units 206 and 208 is anticipated. The design is also extensible to machines having additional types of functional units as known in the art.

It is anticipated that for typical instruction mixes and dependencies, the present design is capable of maintaining high load factors in the functional execution units 220, 222, and 224.

It is also anticipated that one or more instruction decode and dispatch units 206 and 208 may be disabled as performance and power consumption needs of the system dictate. In a particular mode of operation, only one instruction decode and dispatch unit 206 is operational. When the machine is operated this way, the machine operates as a single dispatch machine. This mode is of particular use when executing software has only one thread ready for execution.

In a particular embodiment, the integer functional units 220 have a pipeline length of a maximum of ten cycles, and of accepting commands from the instruction decode and dispatch units 206, 208 every cycle. In this embodiment the allocation unit 210 is capable of reallocating the integer functional units 220 between among the instruction decode and dispatch units 206, 208 every cycle.

There may be times when it is desired to operate the machine at less than its maximum possible performance. At these times, one or more of the plurality of combined address and integer operation execution units 220, floating point units 222, or load/store units 224, may be turned off. So long as one or more of each unit type is left operating, the machine is capable of operation at reduced performance. Turning off functional units conserves power by reducing the number of logic gates switching. Turning off functional units is performed by enabling or disabling unit available flags in an execution unit available register (not shown) associated with the allocation unit 210. Those units marked unavailable in the execution unit available register may have their clocks disabled to further conserve power.

Figure 3:
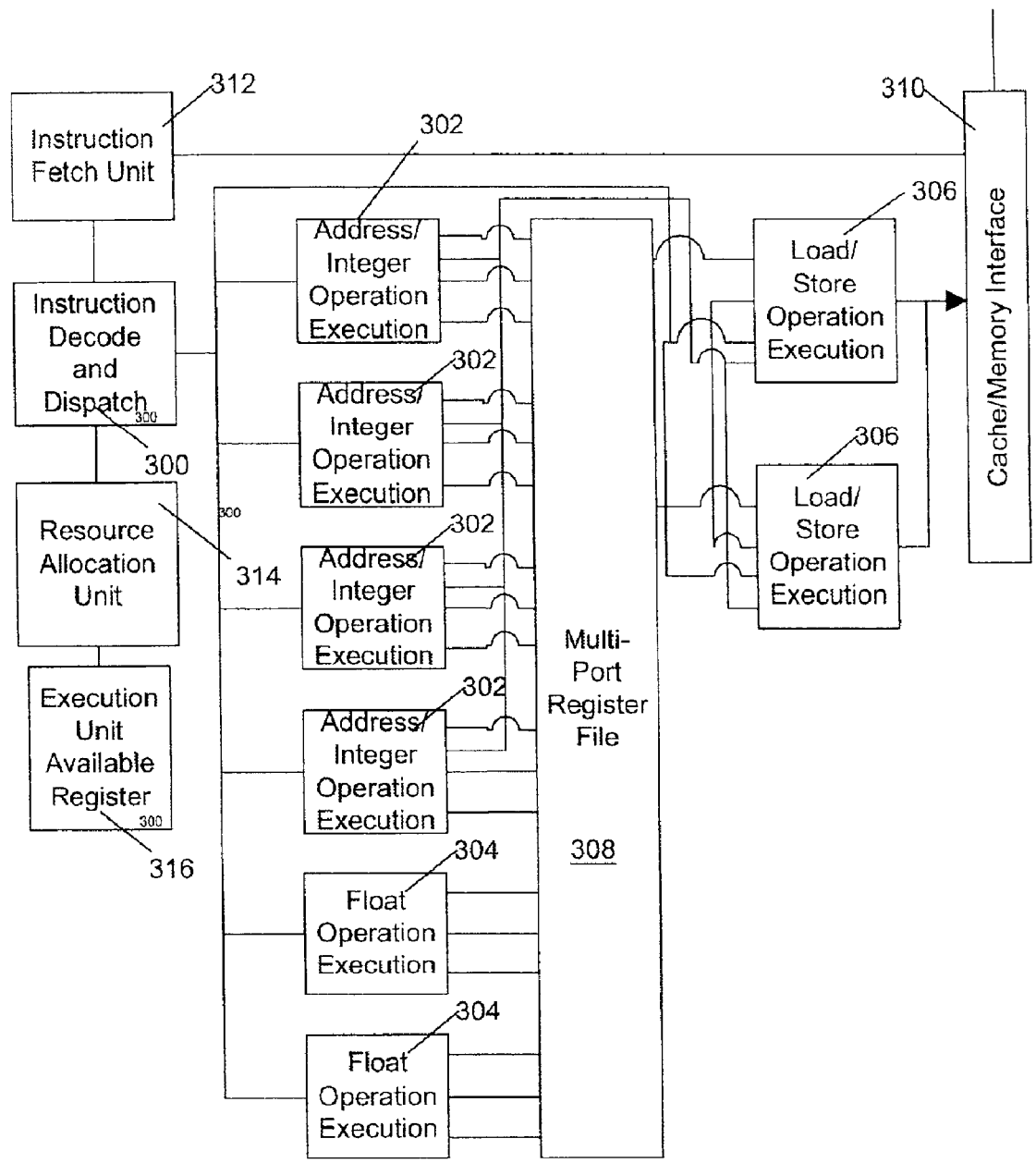
FIG. 3, a single-dispatch machine having the ability to dynamically allocate its pipelines, such that some pipelines may be shut down in low load conditions.

In an alternative embodiment (FIG. 3), having but one instruction decode and dispatch unit 300, there are a plurality of combined address and integer operation execution units 302, floating point units 304, and load/store units 306. These pipelined execution units 302, 304, and 306 are coupled to a register file 308 for storing operands. The load/store units 306 load and store operands to/from cache and memory (not shown) through a cache & memory interface 310, which also provides instructions through an instruction fetch unit 312 to the instruction decode and dispatch unit 300.

When the instruction decode and dispatch unit 300 requires resources, such as execution pipeline units 302, 304, and 306, it requests those units of a resource allocation unit 314. The resource allocation unit 314 is associated with an execution unit available register 316.

With this embodiment, software sets the execution unit available register with a setting based on system loading and power availability. This setting indicates at least one available execution unit of each type, but need not indicate that all units are available. This setting may be changed by software as system load and power availability change.

Those units marked unavailable in the execution unit available register may have their clocks disabled to further conserve power.

Figure 4:
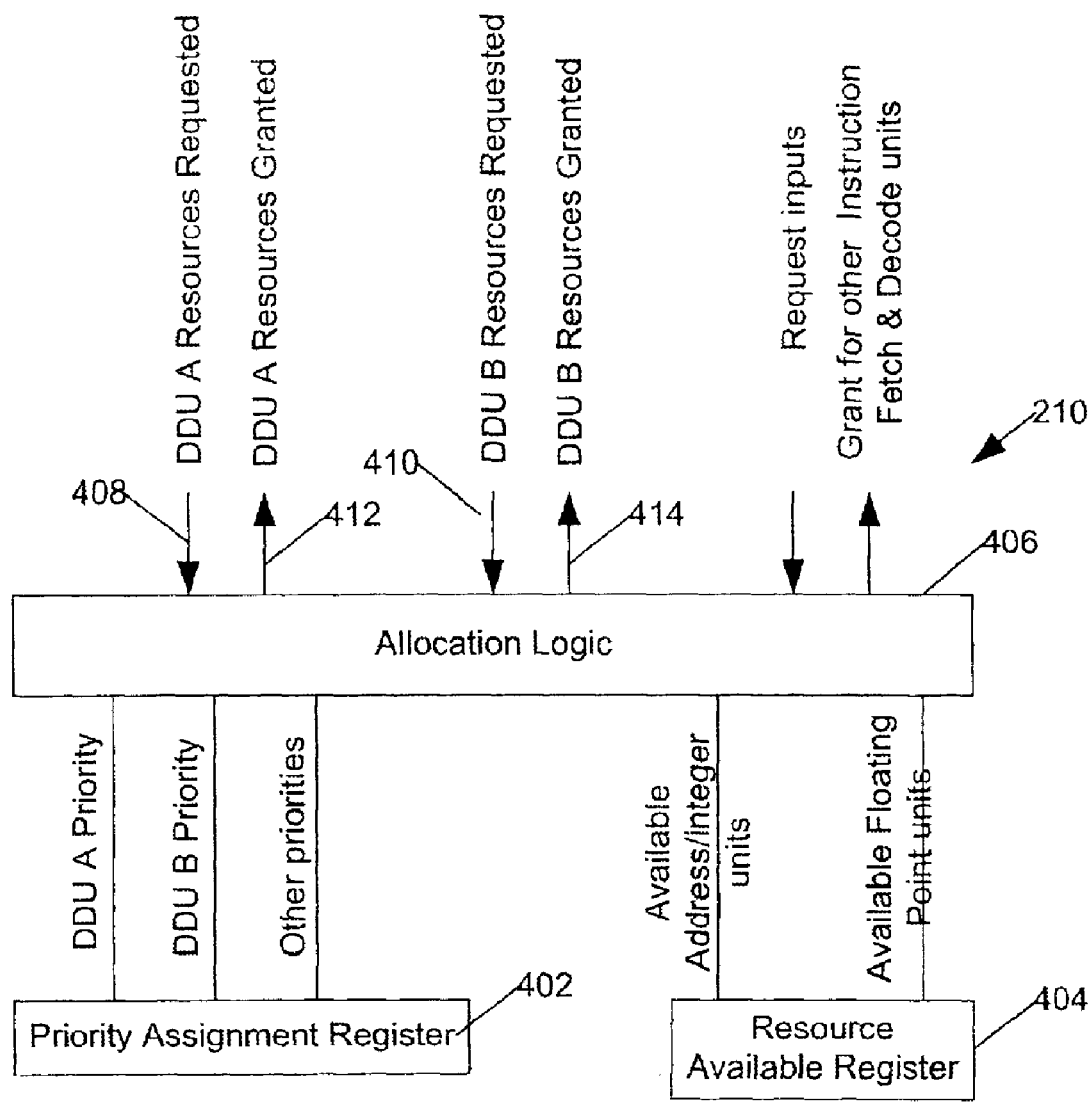
FIG. 4, a block diagram of a resource allocation unit for a multi-dispatch machine.

An allocation unit 210 (FIG. 4), such as may be used with the present processor, has a resource available register 404 and a priority register 402. Priority register 402 has a priority assignment field associated with each instruction decode and dispatch unit, such as decode and dispatch units 206, 208 (FIG. 2). Resource available register has an available resource field for each type of resource, such as floating point units 222 and address/integer units 220, that may be dynamically allocated in the system of which the allocation unit 400 is a part. The allocation unit also has arbitration logic 406 that receives allocation requests 408, 410 from, and grants resources to 412, 414, the instruction decode and dispatch units 206, 208 and any other resource consumers in the machine.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A multiple dispatch processor comprising:

a plurality of instruction fetch units, each instruction fetch unit capable of fetching a stream of instructions;

a plurality of instruction decode and dispatch units each coupled to a corresponding instruction fetch unit of the plurality of instruction fetch units to receive instructions therefrom;

at least one register file coupled for storing operands;

a plurality of execution units coupled to the register file and to the instruction decode and dispatch units for performing operations on operands as directed by the plurality of instruction decode and dispatch units; and a resource allocation unit coupled to allocate execution units among the instruction decode and dispatch units; and wherein the plurality of execution units further comprises a plurality of multifunction execution units, each of the multifunction execution units capable of handling integer and address operations.

2. The multiple dispatch processor of claim 1, wherein the plurality of execution units further comprises a plurality of floating point execution units.

3. A multiple dispatch processor comprising:

a plurality of instruction fetch units, each instruction fetch unit capable of fetching a stream of instructions;

a plurality of instruction decode and dispatch units each coupled to a corresponding instruction fetch unit of the plurality of instruction fetch units to receive instructions therefrom;

at least one register file coupled for storing operands;

a plurality of execution units coupled to the register file and to the instruction decode and dispatch units for performing operations on operands as directed by the plurality of instruction decode and dispatch units; and a resource allocation unit coupled to allocate execution units among the instruction decode and dispatch units;

wherein at least a first execution unit has a clock signal turned off when the first execution unit is marked unavailable in the resource available register, and the clock signal is turned on when the first execution unit is marked available in the resource allocation register.

4. The multiple-dispatch processor of claim 3 wherein at least one execution unit is marked unavailable in the resource allocation register when the processor is operating under low power availability.

5. The multiple-dispatch processor of claim 3 wherein the execution units further comprise a plurality of address-and-integer units and a plurality of floating point units.

* * * * *